United States Patent
Ammouri et al.

(10) Patent No.: US 9,574,708 B2
(45) Date of Patent: Feb. 21, 2017

(54) METHOD FOR FILLING A TANK WITH GAS

(71) Applicant: L'Air Liquide, Société Anonyme pour l'Etude et l'Exploitation des Procédés Georges Claude, Paris (FR)

(72) Inventors: Fouad Ammouri, Massy (FR); Loïc Damongeot, Valenton (FR)

(73) Assignee: L'Air Liquide, Société Anonyme pour l'Etude et l'Exploitation des Procédés Georges Claude, Paris (FR)

( * ) Notice: Subject to any disclaimer, the term of this patent is extended or adjusted under 35 U.S.C. 154(b) by 243 days.

(21) Appl. No.: 14/326,574

(22) Filed: Jul. 9, 2014

(65) Prior Publication Data
US 2015/0013830 A1    Jan. 15, 2015

(30) Foreign Application Priority Data
Jul. 10, 2013 (FR) ...................... 13 56753

(51) Int. Cl.
*F17C 5/06* (2006.01)
*F17C 5/00* (2006.01)
*F17C 13/02* (2006.01)

(52) U.S. Cl.
CPC ................ *F17C 5/007* (2013.01); *F17C 5/06* (2013.01); *F17C 13/023* (2013.01);
(Continued)

(58) Field of Classification Search
CPC ....... F17C 5/007; F17C 13/025; F17C 13/023; F17C 13/026; F17C 5/06; F17C 2250/0694; F17C 2250/0495; F17C 2260/021; F17C 2203/0604; F17C 2227/04; F17C 2223/0123; F17C 2225/036; F17C 2260/025; F17C 2201/056; F17C 2260/023; F17C 2203/0663; F17C 2250/0421; F17C 2250/0439; F17C 2250/0426; F17C 2221/012; F17C 2203/0619; F17C 2225/0123; F17C 2201/058; F17C 2250/043; F17C 2265/065; F17C 2260/026; F17C 2201/0104; F17C 2260/022; F17C 2250/0443; Y02E 60/321
(Continued)

(56) References Cited

U.S. PATENT DOCUMENTS 5,570,729 A    11/1996 Mutter
5,752,552 A *   5/1998 Kountz ................... F17C 5/06
                                                        141/18
(Continued)

FOREIGN PATENT DOCUMENTS

EP    0 653 585    5/1995
FR    2 884 592    10/2006
(Continued)

OTHER PUBLICATIONS

French Search Report and Written Opinion for related FR 1356753, May 22, 2014.

*Primary Examiner* — Nicolas A Arnett
(74) *Attorney, Agent, or Firm* — Elwood L. Haynes

(57) ABSTRACT

The invention relates to a method for filling a tank with a pressurized fuel gas, the average temperature of the gas in the tank is estimated in real time during the filling. The method includes, before the filling, determining the initial temperature of the gas in the tank, determining the initial pressure of the gas in the tank, determining the initial average temperature of the wall of the tank and determining the initial mass of gas in the tank. According to the method, during the filling, the enthalpy of the gas entering into the tank is determined as a function of time and the mass of gas injected into the tank is determined as a function of time or, respectively, the pressure in the tank is determined as a
(Continued)

function of time. The average temperature of the gas at the time in the tank is determined in degrees K.

11 Claims, 1 Drawing Sheet

(52) U.S. Cl.
CPC .......... *F17C 13/025* (2013.01); *F17C 13/026* (2013.01); *F17C 2201/0104* (2013.01); *F17C 2201/056* (2013.01); *F17C 2201/058* (2013.01); *F17C 2203/0604* (2013.01); *F17C 2203/0619* (2013.01); *F17C 2203/0663* (2013.01); *F17C 2221/012* (2013.01); *F17C 2223/0123* (2013.01); *F17C 2225/0123* (2013.01); *F17C 2225/036* (2013.01); *F17C 2227/04* (2013.01); *F17C 2250/043* (2013.01); *F17C 2250/0421* (2013.01); *F17C 2250/0426* (2013.01); *F17C 2250/0439* (2013.01); *F17C 2250/0443* (2013.01); *F17C 2250/0495* (2013.01); *F17C 2250/0694* (2013.01); *F17C 2260/021* (2013.01); *F17C 2260/022* (2013.01); *F17C 2260/023* (2013.01); *F17C 2260/025* (2013.01); *F17C 2260/026* (2013.01); *F17C 2265/065* (2013.01); *Y02E 60/321* (2013.01)

(58) Field of Classification Search
USPC .................................. 141/1–2, 4, 83, 94–95
See application file for complete search history.

(56) References Cited

U.S. PATENT DOCUMENTS

| | | | | |
|---|---|---|---|---|
| 5,771,948 A | * | 6/1998 | Kountz | F17C 5/06 141/18 |
| 5,810,058 A | * | 9/1998 | Kountz | F17C 5/06 141/18 |
| 5,881,779 A | * | 3/1999 | Kountz | F17C 5/06 141/2 |
| 7,647,194 B1 | | 1/2010 | Casey et al. | |
| 8,594,954 B2 | * | 11/2013 | Macron | F17C 5/06 141/18 |
| 8,783,303 B2 | * | 7/2014 | Harty | F17C 5/007 141/11 |
| 9,175,807 B2 | * | 11/2015 | Barth | F17C 5/06 |
| 9,212,783 B2 | * | 12/2015 | Mathison | F17C 5/06 |
| 9,222,620 B2 | * | 12/2015 | Harty | F17C 5/007 |
| 2008/0264514 A1 | * | 10/2008 | Tessier | B01D 53/0438 141/4 |
| 2008/0289591 A1 | * | 11/2008 | Tessier | B01D 53/0438 123/41.31 |
| 2009/0044877 A1 | | 2/2009 | Faudou et al. | |
| 2010/0294393 A1 | | 11/2010 | Allidieres et al. | |
| 2011/0259469 A1 | * | 10/2011 | Harty | F17C 5/007 141/4 |
| 2012/0216915 A1 | * | 8/2012 | Takata | F17C 5/06 141/82 |
| 2013/0263969 A1 | * | 10/2013 | Barth | F17C 5/06 141/4 |
| 2013/0269828 A1 | * | 10/2013 | Mathison | F17C 5/06 141/4 |
| 2014/0174593 A1 | | 6/2014 | Ammouri et al. | |
| 2014/0251495 A1 | * | 9/2014 | Harty | F17C 5/007 141/4 |

FOREIGN PATENT DOCUMENTS

| | | |
|---|---|---|
| FR | 2 920 858 | 3/2009 |
| FR | 2 978 233 | 1/2013 |
| WO | WO 2011 133296 | 10/2011 |

* cited by examiner

METHOD FOR FILLING A TANK WITH GAS

CROSS REFERENCE TO RELATED APPLICATIONS

This application claims the benefit of priority under 35 U.S.C. §119 (a) and (b) to French Patent Application No. 1356753 filed Jul. 10, 2013, the entire contents of which are incorporated herein by reference.

BACKGROUND

The present invention relates to a method for filling a composite tank.

SUMMARY

The invention more particularly relates to a method for filling a type IV composite tank bounded by a wall of generally cylindrical shape and of known size with a pressurized fuel gas, especially gaseous hydrogen, the gas being injected into the tank via an injector of known diameter, in which the average temperature $T(t)$ of the gas in the tank is estimated in real time as a function of time t during the filling, the method comprising, before the filling, a step of determining the initial temperature $T(0)$ of the gas in the tank, a step of determining the initial pressure $P(0)$ of the gas in the tank, a step of determining the initial average temperature of the wall of the tank $T_W(0)$ and a step of determining the initial mass of gas in the tank $m(0)$, the method comprising, during the filling, a step of determining the enthalpy $h_e(t)$ of the gas entering into the tank as a function of time and a step of determining the mass $m(t)$ of gas injected into the tank as a function of time or, respectively, a step of determining the pressure $P(t)$ in the tank as a function of time, the method comprising a step of determining the average temperature $T(t)$ of the gas at the time t in the tank in degrees K.

Filling tanks with gas at high pressures (such as hydrogen at a pressure comprised between 300 and 800 bar) is subject to conflicting constraints. Specifically, vehicle tanks must be filled in a minimum of time (a few minutes) while maximizing the degree of filling and limiting cooling of the injected gas.

It is preferable to know the temperature of the gas in the tank during the filling in order to prevent excessive heating.

However, in what are called "communicationless" filling models this temperature is not measured by a temperature sensor and must therefore be calculated (estimated).

The method according to the invention aims to estimate the temperature of the gas (hydrogen) in the tank during filling from known or easily measurable parameters. This estimation of the temperature in real time allows a "software sensor" to be obtained that may be implemented in a software package with an appropriate frequency, for example of the order of one Hertz (Hz), so that the calculation time is compatible with the method for filling vehicle tanks in a filling station.

The method will especially make use of the parameters mentioned in the "SAE" standard relating to the filling of vehicle hydrogen tanks.

This software sensor may especially be used in filling stations in the case where no provision has been made for dynamic communication with the vehicle, i.e. when the pressure and temperature in the tank of the vehicle to be filled are not communicated to the filling station.

At the present time, the preferred technology consists in determining ramp rates for the pressure in the tank as a function of the ability of the station to cool the gas injected at the inlet of the tank. However, this technology calls for over cooling to ensure that the temperature in the tank always remains below the regulatory limit (85° C.).

This (expensive) over cooling may be decreased by virtue of the method according to the invention.

The method according to the invention may especially be implemented in a method comprising a known preliminary pre-filling step in which a short (a few seconds) pressure jet is used to estimate the properties of the tank such as the mass, pressure and temperature of the gas in the tank before the filling.

After this preliminary step, a following step may consist in the actual filling. During the latter, the variation of the temperature of the gas in the tank is estimated in real time in order to deduce therefrom the mass (or the pressure) and therefore the density of the gas at each time. This method, associated with a strategy for controlling the filling allows the filling to be stopped when a final mass, density or pressure criterion has been reached.

One aim of the present invention is to mitigate all or some of the aforementioned drawbacks of the prior art.

For this purpose, the method according to the invention, moreover conforming to the generic definition that was given thereof in the above preamble, is essentially characterized in that this average temperature $T(t)$ is expressed as a function of the first degree of the average temperature $T(t-1)$ of the gas at the preceding time $(t-1)$ and of a coefficient $k_g(t-1)$ of convective heat transfer between the gas and the internal wall of the tank at the time $(t-1)$ in $W \cdot m^{-2} \cdot K^{-1}$, in which the heat transfer coefficient $k_g(t-1)$ is given by the relationship $k_g = (\lambda g/Dint)$Nuint in which $\lambda g$ is the thermal conductivity of the gas in the tank in $W \cdot m^{-1} \cdot K^{-1}$, Dint is the inside diameter of the tank in meters and Nuint the (dimensionless) Nusselt number of the gas in the tank, and in which the Nusselt number of the gas is expressed as a function of the (dimensionless) Reynolds number (Red) relating to forced convection in the tank and the (dimensionless) Rayleigh number (Radint) relating to natural convection inside the tank by a formula Nuint=$a \cdot \text{Radint}^b + c \cdot \text{Red}^d$ in which a is a dimensionless coefficient depending on the ratio (Lint/Dint) of the inside length Lint of the tank in meters to the inside diameter Dint of the tank in meters and c being a dimensionless coefficient depending on the ratio (Dint/di) of the inside diameter Dint of the tank in meters to the diameter di of the injector in meters, a, b, c and d being dimensionless positive real numbers, a being comprised between 0 and 0.2, b being comprised between 0.2 and 0.5, c being comprised between 0 and 0.3 and d being comprised between 0.5 and 0.9.

Moreover, embodiments of the invention may comprise one or more of the following features:
the dimensionless coefficient a depending on the ratio (Lint/Dint) is given by the formula:

$$a = a1 * \exp(a2 * (L_{int}/D_{int}))$$

in which "exp" signifies the exponential function, where a1 is comprised between 0 and 0.04 and a2 is comprised between 0.1 and 0.3;
the dimensionless coefficient c depending on the ratio (Dint/di) is given by the formula:

$$c = c1 * \exp(c2 * (Dint/d))$$

in which "exp" signifies the exponential function, c1 being comprised between 0 and 0.05 and c2 being comprised between 0.5 and 3;

the wall of the composite tank comprises a plastic liner and a composite layer and is considered to be a homogeneous wall when modelling its temperature ($T_w$), i.e. the heat capacity and mass of the wall are the averages of those of the two constituents of the wall that are the liner and the composite layer;

the average temperature T(t) of the gas is determined in real time by solving numerically two enthalpy balances: a first enthalpy balance applied to the gas injected into the tank and a second enthalpy balance applied to the wall of the tank, using the equation of state of real gases applied to the gas in the tank, thermophysical properties of the gas such as the compressibility factor Z, the specific heat capacity cp and the enthalpy per unit mass h of the gas being known;

the mass of gas in the tank is determined in real time by solving numerically two enthalpy balances: a first enthalpy balance applied to the gas injected into the tank and a second enthalpy balance applied to the wall of the tank, using the equation of state of real gases applied to the gas in the tank, thermophysical properties of the gas such as the compressibility factor Z, the specific heat capacity cp and the enthalpy per unit mass h of the gas being known;

the average pressure P(t) of the gas in the tank is determined in real time by solving numerically two enthalpy balances: a first enthalpy balance applied to the gas injected into the tank and a second enthalpy balance applied to the wall of the tank, using the equation of state of real gases applied to the gas in the tank, thermophysical properties of the gas such as the compressibility factor Z, the specific heat capacity $c_p$ and the enthalpy per unit mass h of the gas being known;

the average temperature of the wall of the tank Tw(t) is determined in real time by solving numerically two enthalpy balances: a first enthalpy balance applied to the gas injected into the tank and a second enthalpy balance applied to the wall of the tank, using the equation of state of real gases applied to the gas in the tank, thermophysical properties of the gas such as the compressibility factor Z, the specific heat capacity Cp and the enthalpy per unit mass h of the gas being known;

the tank has a ratio (Lint/Dint) of the inside length of the tank Lint in meters to the inside diameter of the tank Dint in meters comprised between 1.5 and 7 and preferably comprised between 1.8 and 6.6;

the ratio (Dint/di) of the inside diameter of the tank Dint in meters to the diameter di of the injector in meters is comprised between 30 and 80 and preferably comprised between 35.0 and 72.3;

the (dimensionless) Reynolds number (Red) relating to forced convection in the tank is comprised between $5.6 \times 10^4$ and $2.0 \times 10^6$; and the (dimensionless) Rayleigh number (Radint) relating to natural convection inside the tank is comprised between $8.0 \times 10^8$ and $1.0 \times 10^{12}$.

The invention may also relate to any alternative device or method comprising any combination of the features described above or below.

BRIEF DESCRIPTION OF THE DRAWINGS

Other particularities and advantages will become apparent on reading the following description, given with reference to the figures in which.

DESCRIPTION OF PREFERRED EMBODIMENTS

Figure 1:
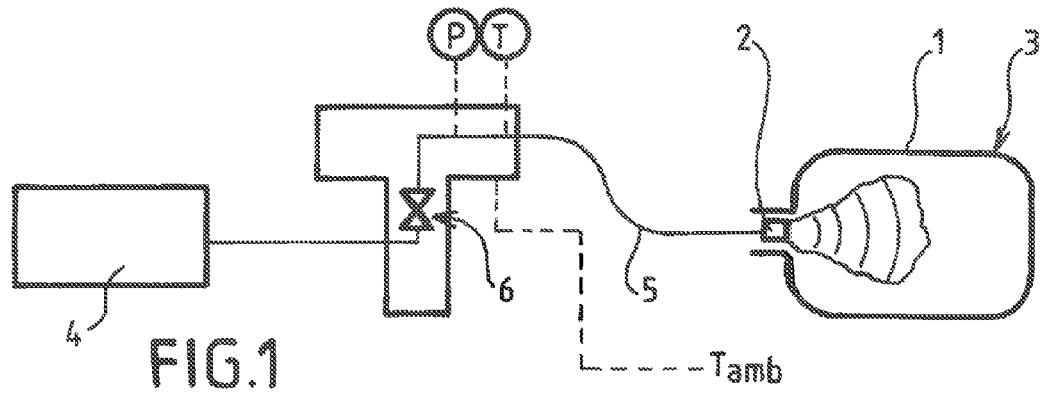
FIG. 1 shows a partial schematic view illustrating an example filling station able to implement the method according to the invention.

The filling station partially and schematically illustrated in FIG. 1 comprises an injector 2 located at the end of a flexible tube 5 intended to be connected to the orifice of a tank 1 to be filled. The flexible tube 5 is connected via at least one valve system 6 to a source 4 of pressurized gas.

The method preferably makes use of a model of the macroscopic thermal effects that come into play in the system comprising the flexible tube 5, the tank 1 and its environment during the filling of the tank 1.

The physical properties of the gas (e.g. hydrogen) at the outlet of the injector 2 or just upstream of the latter are assumed to be known (pressure P and temperature T in real time). This allows the enthalpy h of the gas to be calculated at this location.

As detailed below, the model preferably uses simplifying assumptions to decrease the calculation time while still ensuring a good approximation of the effects in question.

In addition, to obtain the desired interoperability between stations, the calculation of the magnitude of each of the effects must be related to characteristic parameters of the tanks to be filled, communicated to the station by virtue of the communication protocol standardized by the SAE standard. Thus, the geometric dimensions of the tank 1 are assumed to be known (length, diameter, area(s), etc.).

According to one advantageous feature, the model uses a Nusselt correlation to determine the temperature variation in the tank. This Nusselt correlation is expressed by way of two adimensional numbers: the Reynolds number relating to forced internal convection and the Rayleigh number relating to natural internal convection. According to one particularly advantageous particularity these two adimensional numbers are expressed by an expression depending on the geometry of the tank, in particular the ratios $L_{int}$/Dint and Dint/di.

Lint being the inside length of the tank in meters, Dint the inside diameter of the tank and di the diameter of the injector in meters (known).

This method allows any hydrogen vehicle to be effectively and rapidly filled without measuring the temperature of the gas in the tank.

Preferably, the model for estimating the temperature of the gas in the tank 1 is what is called a "zero dimensional" ("0D") mathematical model.

Such a model assumes that the gas (hydrogen in our example) entering into the tank 1 is immediately and perfectly mixed with the gas present. In addition, the temperature T(t) of the hydrogen in the tank 1 is considered to be uniform at every point. Thus, and as accepted in current standards and draft standards, the temperature T(t) of the gas in the tank (1), whether estimated or measured, is considered to be the average temperature of the gas in the tank 1.

In addition, the temperature T(0) of the gas in the tank 1 before filling is approximated to ambient temperature Tamb because the tank 1 is assumed to be in thermodynamic equilibrium before it is filled.

There is a compromise between the precision and the complexity of the model of the method for estimating the temperature T(t) (complexity constraining its calculation speed).

The principal physical effects coming into play during the filling are: compression and injection of gas into the tank 1, internal convection between the gas and the wall 3 of the tank 1, external convection between the wall 3 of the tank 1 and the ambient air, and radiation from the external wall 3 of the tank 1 into the atmosphere.

This model may be divided into two subsystems: 1) the gas (hydrogen) and 2) the wall of the tank (liner+composite when it is a question of a composite tank).

Thus, the gas will exchange heat with the wall 3 of the tank 1, which itself will interact with the surrounding medium. Each subsystem is therefore characterized by its own temperature, pressure and mass variables. These subsystems interact with each other and exchange heat in order to reach equilibrium.

In addition, during the filling, the gas injected into the tank 1 from the source 4 has its own enthalpy he.

The amount of heat transferred is related to the transfer area. Therefore, it is essential to know the characteristic dimensions of the tank 1 that are the inside diameter Dint and the inside length Lint. The forced convection related to the movement engendered by the flow of gas entering into the tank will be characterized by the injection diameter di of the injector 2 in the neck of the tank (at the orifice).

To determine the temperature T of the gas in the tank 1, it is necessary to consider the preponderant effects at play in the system in question during the filling phase and having an impact on this temperature. The effects considered are:

- admission of the gas, i.e. the thermodynamic state of the gas injected into the tank 1 (which differs from that initially present);
- compression of the gas in the tank 1 (hydrogen heats up when compressed);
- internal convection (only the wall 3 limits exchange between the interior and exterior of the tank 1 and therefore internal convection allows heat to be evacuated to the exterior);
- external convection (between the exterior and the tank 1); and
- radiation between the external wall 3 and the surrounding air (exchange of heat by radiation with the atmosphere due to the difference between the temperature Tw of the wall 3 and the external ambient temperature Tamb).

One preponderant effect is missing from this list. This is conduction in the wall 3 of the tank 1. The following paragraph explains this and the associated assumptions.

According to one advantageous particularity, the composite wall 3 of a type IV tank known per se (liner+reinforcing fibres) is considered to be homogeneous as regards heat exchange (single homogeneous wall the properties of which correspond to the weighted average of each component, the temperature in the thickness of the wall 3 is modelled by a gradient).

All the physical effects described above may be written as mathematical equations. Two energy balances and one equation of state may allow an expression for the temperature T(t) depending on known data to be defined.

Figure 2:
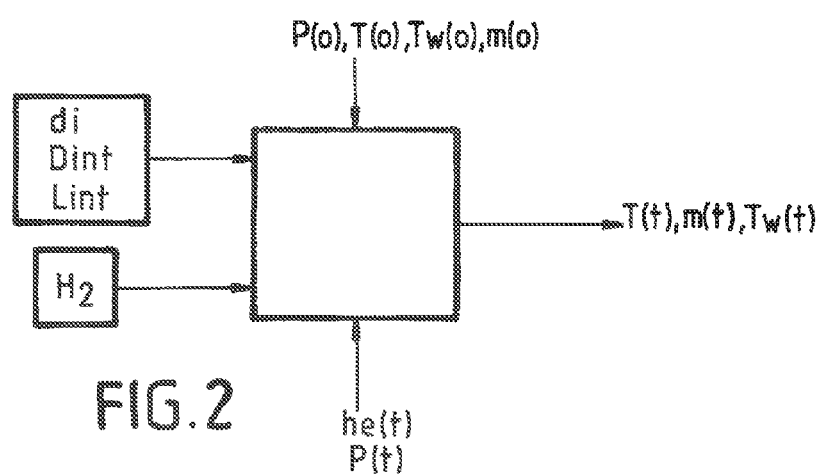
FIGS. 2 and 3 show partial schematic views illustrating two possible examples of implementation of the method according to the invention, respectively.

As illustrated in FIG. 2, the (known) input data (parameters) may be:

- constant data, namely: physical properties of hydrogen ($H_2$), the geometry of the tank (Dint, Lint, etc.), the diameter di of the injector and physical properties of the walls 3;
- initial conditions (variables), namely: the initial pressure of the gas in the tank P(0), the initial temperature of the gas in the tank 1 T(0), the initial temperature of the wall of the tank Tw(0) and the initial mass of gas in the tank m(0); and
- the enthalpy he(t) of the injected gas and the pressure P(t) measured as close as possible to the tank 1, for example in the flexible tube 5.

These data are known, calculated or easily measured.

From these input data the model may calculate the following output data:

- the temperature T(t) of the gas in the tank 1 at the time t;
- the mass m(t) of the gas in the tank 1 at the time t; and
- the temperature Tw(t) of the wall of the tank 1 at the time t.

Figure 3:
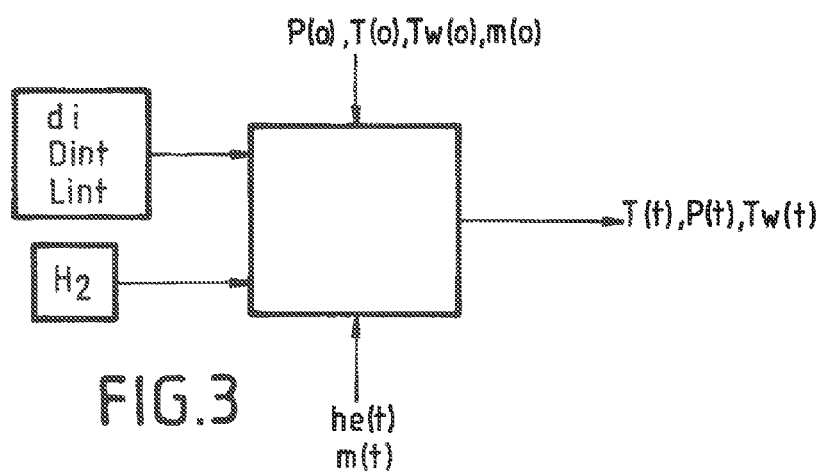

In the variant in FIG. 3, the device is provided with a sensor for measuring the flow rate of the gas entering into the tank 1. In this case, the mass m(t) of gas injected in real time into the tank 1 is an input datum and the pressure P(t) of the gas in the tank is an output (calculated) datum.

The first energy balance equation gives the enthalpy balance for the gas in the tank 1. Three terms have an impact on the enthalpy variation: the first is due to compression of the gas, the second represents convection between the gas and the internal wall of the tank and the third term results from the amount of gas injected into the tank. The equation obtained is:

$$\frac{dh}{dt} = \frac{1}{\rho} \times \frac{dP}{dt} + \frac{k_g \times S_i}{m} \times (T_{wi} - T) + \frac{\dot{m}}{m} \times (h_e - h) \quad \text{(Eq. 1)}$$

where m=the mass of gas in the tank (in kg);

dh/dt=the time derivative of the enthalpy per unit mass of the gas in the tank (in $J \cdot kg^{-1} \cdot s^{-1}$);

V=the volume of the tank (in $m^3$);

dP/dt=the time derivative of the pressure of the gas in the tank (in $Pa \cdot s^{-1}$);

kg=the coefficient of convective transfer between the gas and the internal wall (in $W \cdot m^{-2} \cdot K^{-1}$);

Si=the inside area of the wall of the tank (in $m^2$);

m=the mass of gas in the tank (in kg);

$h_e$=the enthalpy per unit mass of the gas entering into the tank (in $J \cdot kg^{-1}$);

h=the enthalpy per unit mass of the gas in the tank (in $J \cdot kg^{-1}$);

$T_{wi}$=the temperature of the internal wall of the tank making direct contact with the gas=$(T+T_w)/2$. This temperature is assumed to be equal to the average of the temperature T of the gas and that $T_w$ of the wall (in K); and $\dot{m}$=the mass flow rate entering into the tank ($kg \cdot s^{-1}$).

To correctly calculate the value of the enthalpy per unit mass, the general definition of the enthalpy h of a real gas is used (see below):

$$dh = Cp \times dT + (1 - \beta T) \times \frac{dP}{\rho} \quad \text{(Eq. 2)}$$

where dh=the variation in the enthalpy of the fluid in question (in $J \cdot kg^{-1}$);

Cp=the specific heat capacity at constant pressure of the fluid in question (in $J \cdot kg^{-1} \cdot K^{-1}$);

dT=the variation in the temperature of the fluid in question (in K);

β=the isochoric compressibility coefficient of the fluid in question (in $K^{-1}$);

T=the temperature of the fluid in question (in K);

dP=the variation in the pressure of the fluid in question (in Pa); and

ρ=the density of the fluid in question (in $kg \cdot m^{-3}$).

By inserting the temperature of the gas T, the temperature Tw of the wall and the pressure P of the gas in the tank 1, equation 3 is obtained:

$$m \times Cp \frac{dT}{dt} = V \times \beta \times T \times \frac{dP}{dt} + k_g \times S_i \times (T_{wi} - T) + \dot{m} \times (h_e - h) \quad \text{(Eq. 3)}$$

The second equation defining the enthalpy balance applied to the wall 3 of the tank is given by Equation 4 below (the three terms on the right of the equation represent the heat transferred to the wall by internal convection, by external convection and by radiation, respectively).

$$m_w \times Cp_w \times \frac{dT_w}{dt} = k_g \times S_i \times (T - T_{wi}) + \quad \text{(Eq. 4)}$$
$$k_a \times S_e \times (T_{amb} - T_{we}) + \varepsilon \times \sigma \times S_e \times (T_{amb}^4 - T_{we}^4)$$

where $k_g$=the coefficient of convective transfer between the external wall and the ambient air (in $W \cdot m^{-2} \cdot K^{-1}$);

$S_e$=the external area of the wall of the tank (in $m^2$);

ε=the emissivity of the external wall of the tank (dimensionless);

σ=the Stefan-Boltzmann constant (in $W \cdot m^{-2} \cdot K^{-4}$=5.67× $10^{-8}$);

$T_{amb}$=the ambient temperature (in K);

$T_{we}$=the temperature of the external surface of the wall of the tank. This temperature is equal to the average of the ambient temperature $T_{amb}$ and that $T_w$ of the wall $T_{we}$=($T_w$+ $T_{amb}$)/2 (in K);

$T_{wi}$=the temperature of the internal surface of the wall of the tank (in K);

$S_i$=the inside area of the wall of the tank (in $m^2$); and $Cp_w$=the specific heat capacity of the wall of the tank (in $J \cdot kg^{-1} \cdot K^{-1}$).

The third equation is the equation of state applied to the gas in the tank 1.

$$P \cdot V = n \cdot R \cdot Z(P,T) \cdot T \quad \text{(Eq. 5)}$$

where n=the quantity of material in the tank in mol;

R=ideal gas constant (=8.314 $Pa \cdot m^3 \cdot mol^{-1} \cdot K^{-1}$); and

Z(P, T) is the (dimensionless) compressibility factor of the real gas in question, a function of pressure P and temperature T. This function is known and tabulated for gases as a function of temperature and pressure.

This formula is preferred to the ideal gas law for a wide range of pressures.

It is then possible to express the pressure P in the tank as a function of m (mass) and T (temperature) via Equation 5.

$$P = \frac{R}{V \times M} \times Z(T, P) \times m \times T$$

Equations 3, 4 and 5 allow the three unknowns (P, T, $T_w$) to be calculated.

This may be achieved by discretization in order to carry out a step-by-step calculation (for example with the software package Matlab®). The numerical process chosen may be a process such as the time explicit Euler process. There is no discretization of space if the model is a zero dimensional (0D) model.

The thermodynamic parameters Cp, β, h, Z may be precisely calculated by interpolation from NIST data tables, pressure and temperature (P and T) being known. NIST is the abbreviation of "National Institute of Standards and Technology".

In the following equations, the indices t and t−1 correspond to the present time t and the preceding time t−1, respectively. The derivatives are replaced by variations between two consecutive times.

The following approximation is used: the value of the specific heat capacity of the gas is calculated at (t−1) instead of at the time (t). Specifically, since the temperature T(t) is still not known it is not possible to read the value of Cp(t) from a table. This assumption may be made because the specific heat capacity varies little between two consecutive times.

P(t)=(R/V·M)·Z(T(t),P(t))·m(t)·T(t) approximates to $$P(t) = (R/V \cdot M) \cdot Z(T(t-1), P(t-1)) \cdot m(t) \cdot T(t) \quad \text{(Eq. 6)}$$

By discretizing Equation 3 and by isolating T(t) via Equation 6, it is possible to express T(t) in the following form:

$$T_t = T_{t-1} \times \frac{1 - \frac{m_{t-1}}{m_t} \times A_{t-1}}{1 - A_{t-1}} + \frac{\Delta t \times k_{gt-1} \times S_i \times (T_{wt-1} - T_{t-1}) + (m_t - m_{t-1}) \times (h_{et-1} - h_{t-1})}{m_t \times Cp_{t-1} \times (1 - A_{t-1})}, \quad \text{(Eq. 7)}$$

where $$A_{t-1} = \frac{\beta_{t-1} \times T_{t-1} \times R \times Z(T_{t-1}, P_{t-1})}{Cp_{t-1} \times M} \text{ and}$$

$$A_t = \frac{\beta_t \times T_t \times R \times Z(T, P)}{Cp_t \times M}.$$

This equation is a discretized expression of the temperature T(t) of the gas at the time t. This expression can be implemented in an algorithm of the "software sensor".

In the same way, it is possible to discretize the last unknown, namely the temperature of the wall $T_w$(t) obtained from Equation 4:

$$T_w(t) = \quad \text{(Eq. 8)}$$
$$T_w(t-1) + \frac{\Delta t}{m_w Cp_w} \begin{bmatrix} k_g(t-1) S_i (T(t-1) - T_{wi}(t-1)) + \\ k_a(t-1) S_e (T_{amb}(t-1) - T_{we}(t-1)) + \\ \varepsilon \sigma S_e (T_{amb}^4(t-1) - T_{we}(t-1)) \end{bmatrix}$$

where $m_w$=the mass of the wall in kg;

$Cp_w$=the (modelled) specific heat capacity of the wall in $J \cdot kg^{-1} \cdot K^{-1}$;

$k_g$(t−1)=the coefficient of convective heat transfer at the time t−1 between the gas and the internal wall in $W \cdot m^{-2} \cdot K^{-1}$;

$k_a$(t−1)=the coefficient of convective transfer at the time t−1 between the external wall and the ambient air in $W \cdot m^{-2} \cdot K^{-1}$;

$S_i$=the internal area of the tank in m²;
$S_e$=the area of the external wall of the tank in m²;
$T_{wi}(t-1)$=the temperature of the internal surface of the wall of the tank at the time (t-1) in K;
$T_{we}(t-1)$=the temperature of the external surface of the wall of the tank at the time (t-1) in K; and
$\epsilon$=the emissivity of the tank (dimensionless) and $\sigma$=Boltzmann's constant in $W \cdot m^{-2} \cdot k^{-4} = 5.67 \times 10^{-8}$.

Equations 6, 7 and 8 allow the three unknowns T(t), $T_w(t)$ and P(t) (or m(t)) to be calculated by iterative calculation.

Expressions for the transfer coefficients $k_a$ and $k_g$ are detailed below.

The heat transfer coefficients, which define the profile of the temperature increase during filling, are expressed via adimensional numbers. When the fluid is in forced flow (case of filling), writing the convection correlations in universal form involves three adimensional numbers: the Nusselt number $(Nu=(k_g \cdot Lc)/\lambda)$, the Prandtl number $Pr = (\mu \cdot Cp/\lambda)$ and the Reynolds number $Re = V \cdot Lc/v$, where:

Nu is the (dimensionless) Nusselt number, Pr is the (dimensionless) Prandtl number, Re is the (dimensionless) Reynolds number, Lc is the characteristic length of the tank (in m), $\lambda$ is the thermal conductivity of the gas in $W \cdot m^{-1} \cdot K^{-1}$, v is the kinematic viscosity of the gas in $m^2 \cdot s^{-1}$ and $\mu$ is the dynamic viscosity of the gas in $kg \cdot m^{-1} \cdot s^{-1}$.

In phases where the mass flow rate entering into the tank is zero (in the pre-filling phase before and after the pressure pulse, during a buffer change, etc.) the convection in the tank is no longer mixed (forced+natural) but only natural. In this case, the number that governs the natural convection is the Grashof number (Gr), but commonly accepted correlations use the Rayleigh number (Ra).

By applying these adimensional numbers to our thermodynamic system, the internal convection in the tank kg and the external convection ka can then be written, with the corresponding indices, as:

$$k_g = (\lambda gas/Lc) \cdot Nu\text{int and } k_a = (\lambda air/Lc) \cdot Nu\text{ext}$$

where Nuint=the Nusselt number of the gas in the tank and Nuext=the Nusselt number of the air outside the tank.

The value of the Nusselt number is strongly dependent on the reference quantities chosen and the physical meaning intended to be given thereto. In our case the characteristic lengths are defined as Lc=Dint (inside diameter of the tank) for $k_g$, and Lc=Dext (outside diameter of the tank) for $k_a$.

The Nusselt number defines the ratio of the heat transmitted by conduction and convection at the limit between a wall and a fluid. The thermal conductivity $\lambda$ is a property of the gas varying with pressure P and temperature T and may be precisely calculated for example by interpolation of NIST data.

According to one advantageous particularity, the Nusselt number of the gas is correlated both to the Rayleigh number (Ra) and to the Reynolds number (Re) by the formula:

$Nu\text{int} = a \cdot Ra\text{int}^b + c \cdot Re^d$ in which a is a dimensionless coefficient depending on the ratio (Lint/Dint) of the inside length of the tank Lint in meters to the inside diameter of the tank Dint in meters, c being a dimensionless coefficient depending on the ratio (Dint/di) of the inside diameter of the tank Dint in meters to the diameter di of the injector in meters, a, b, c and d being dimensionless positive real numbers, a being comprised between 0 and 0.2, b being comprised between 0.2 and 0.5, c being comprised between 0 and 0.3 and d being comprised between 0.5 and 0.9.

This expression has been validated experimentally (the temperature T(t) estimated by the software sensor was compared to physical measurements carried out on tanks instrumented with temperature and pressure sensors).

The inventors have observed that this expression gave very satisfactory results for type IV tanks the Lint/Dint ratio of which was comprised between 1.5 and 7 and preferably 1.8 and 6.6 and with a Dint/di ratio comprised between 30 and 80 and preferably between 35.0 and 72.3.

The inventors have observed that the Reynolds number and its associated coefficients (c and d) allow the maximum temperature reached by the gas during a filling operation to be adjusted. For its part, the Rayleigh number and the associated coefficients (a and b) determine the profile of the temperature variation of the gas, in particular before and after the filling phase even though the two actions are combined during filling.

The fidelity of the estimation is particularly high in the case where the dimensionless coefficient a depending on the ratio (Lint/Dint) is given by the formula:

$$a = a1 * \exp(a2 * (Lint/Dint))$$

in which "exp" signifies the exponential function, where a1 is comprised between 0 and 0.04 and a2 is comprised between 0.1 and 0.3; and the dimensionless coefficient c depending on the ratio (Dint/di) is given by the formula:

$$c = c1 * \exp(c2 * (Dint/d))$$

in which "exp" signifies the exponential function, c1 being comprised between 0 and 0.05 and c2 being comprised between 0.5 and 3.

The (dimensionless) Reynolds number (Red) relating to forced convection in the tank 1 is preferably comprised between $5.6 \times 10^4$ and $2.0 \times 10^6$. In addition, the (dimensionless) Rayleigh number (Radint) relating to natural internal convection in the tank (1) is preferably comprised between $8.0 \times 10^8$ and $1.0 \times 10^{12}$.

The effectiveness of this model was validated by four test trials combining test beds or actual filling stations and six tanks.

The relative error in the maximum temperature reached at the end of the filling was smaller than 3%. This was equivalent to an average deviation with respect to the measured temperature of about 8 K (the standard deviation being 3.45 K).

By virtue of these results, the method allows the mass m(t) of gas in the tank 1 to be calculated at each time and therefore the mass transferred from the start of the filling to be obtained. Specifically, knowing the pressure and volume and having estimated the temperature, the real gas law allows the quantity of material to be deduced and therefore the mass since the molar mass of hydrogen is known.

According to the method, the temperature during filling may advantageously be estimated in filling stations where dynamic communication with the vehicle is not possible (the pressure and temperature in the tank of the connected vehicle are not communicated to the station).

It will be understood that many additional changes in the details, materials, steps and arrangement of parts, which have been herein described in order to explain the nature of the invention, may be made by those skilled in the art within the principle and scope of the invention as expressed in the appended claims. Thus, the present invention is not intended to be limited to the specific embodiments in the examples given above.

The invention claimed is:
1. A method for filling a type IV composite tank bounded by a wall of generally cylindrical shape with a pressurized fuel gas, the gas being injected into the tank via an injector of diameter (di), in which the average temperature T(t) of the gas in the tank is estimated in real time as a function of time t during the filling, the method comprising, 1) before the filling, and after utilizing a pre-filling pressure jet of the gas,
   a. determining the initial temperature T(0) of the gas in the tank,
   b. determining the initial pressure P(0) of the gas in the tank,
   c. determining the initial average temperature of the wall of the tank $T_W(0)$ and
   d. determining the initial mass of gas in the tank m(0),
2) during the filling,
   a. determining the enthalpy $h_e(t)$ of the gas entering into the tank as a function of time and
   b. determining the mass m(t) of gas injected into the tank as a function of time or, respectively,
   c. determining the pressure P(t) in the tank as a function of time,
   d. determining the average temperature T(t) of the gas at the time t in the tank in degrees K,
      i. wherein T(t) is a function of the first degree of the average temperature T(t−1) of the gas at the preceding time (t−1) and of a heat transfer coefficient $k_g(t-1)$ of convective heat transfer between the gas and the internal wall of the tank (1) at the time (t−1) in $W \cdot m^{-2} \cdot K^{-1}$,
      ii. wherein $k_g(t-1)$ is given by the relationship $k_g = (\lambda g/Dint) \cdot Nuint$, $\lambda g$ is the thermal conductivity of the gas in the tank in $W \cdot m^{-1} \cdot K^{-1}$,
      Dint is the inside diameter of the tank in meters and
      Nuint is the Nusselt number of the gas in the tank,
   wherein Nuint is a function of the Reynolds number (Red) relating to forced convection in the tank and the Rayleigh number (Radint) relating to natural convection inside the tank by a formula $Nuint = a \cdot Radint^b + c \cdot Red^d$,
   wherein a is a dimensionless coefficient depending on the ratio (Lint/Dint) of the inside length Lint of the tank in meters to the inside diameter Dint of the tank in meters, and
   wherein c being a dimensionless coefficient depending on the ratio (Dint/di) of the inside diameter Dint of the tank in meters to the diameter di of the injector in meters, a, b, c and d being dimensionless positive real numbers, a being between 0 and 0.2, b being between 0.2 and 0.5, c being between 0 and 0.3 and d being between 0.5 and 0.9.

2. The method of claim 1, wherein the dimensionless coefficient a depending on the ratio Lint/Dint is given by the formula:

$$a = a1 * \exp(a2 * (Lint/Dint))$$

in which "exp" signifies the exponential function, where a1 is between 0 and 0.04 and a2 is between 0.1 and 0.3.

3. The method of claim 1, wherein the dimensionless coefficient c depending on the ratio (Dint/di) is given by the formula:

$$c = c1 * \exp(c2 * (Dint/d))$$

in which "exp" signifies the exponential function, c1 being between 0 and 0.05 and c2 being between 0.5 and 3.

4. The method of claim 1, wherein the average temperature T(t) of the gas is determined in real time by solving numerically two enthalpy balances: a first enthalpy balance applied to the gas injected into the tank and a second enthalpy balance applied to the wall of the tank, using the equation of state of real gases applied to the gas in the tank, and thermophysical properties of the gas comprising the compressibility factor Z, the specific heat capacity cp and the enthalpy per unit mass h of the gas.

5. The method of claim 1, wherein the mass of gas in the tank is determined in real time by solving numerically two enthalpy balances: a first enthalpy balance applied to the gas injected into the tank and a second enthalpy balance applied to the wall of the tank, using the equation of state of real gases applied to the gas in the tank, and thermophysical properties of the gas comprising the compressibility factor Z, the specific heat capacity cp and the enthalpy per unit mass h of the gas.

6. The method of claim 1, wherein the average pressure P(t) of the gas in the tank is determined in real time by solving numerically two enthalpy balances: a first enthalpy balance applied to the gas injected into the tank and a second enthalpy balance applied to the wall of the tank, using the equation of state of real gases applied to the gas in the tank, and thermophysical properties of the gas comprising the compressibility factor Z, the specific heat capacity $c_p$ and the enthalpy per unit mass h of the gas.

7. The method of claim 1, wherein the average temperature of the wall of the tank Tw(t) is determined in real time by solving numerically two enthalpy balances: a first enthalpy balance applied to the gas injected into the tank and a second enthalpy balance applied to the wall of the tank, using the equation of state of real gases applied to the gas in the tank, and thermophysical properties of the gas comprising the compressibility factor Z, the specific heat capacity Cp and the enthalpy per unit mass h of the gas.

8. The method of claim 1, wherein the tank has a ratio (Lint/Dint) of the inside length of the tank Lint in meters to the inside diameter of the tank Dint in meters is between 1.5 and 7.

9. The method of claim 1, wherein the ratio (Dint/di) of the inside diameter of the tank Dint in meters to the diameter di of the injector (2) in meters is between 30 and 80.

10. The method of claim 1, wherein the Reynolds number (Red) relating to forced convection in the tank is between $5.6 \times 10^4$ and $2.0 \times 10^6$.

11. The method of claim 1, wherein the Rayleigh number (Radint) relating to natural convection inside the tank is between $8.0 \times 10^8$ and $1.0 \times 10^{12}$.

* * * * *